June 3, 1947.  W. J. RADY  2,421,523
BATTERY CHARGING SYSTEM
Filed July 23, 1945
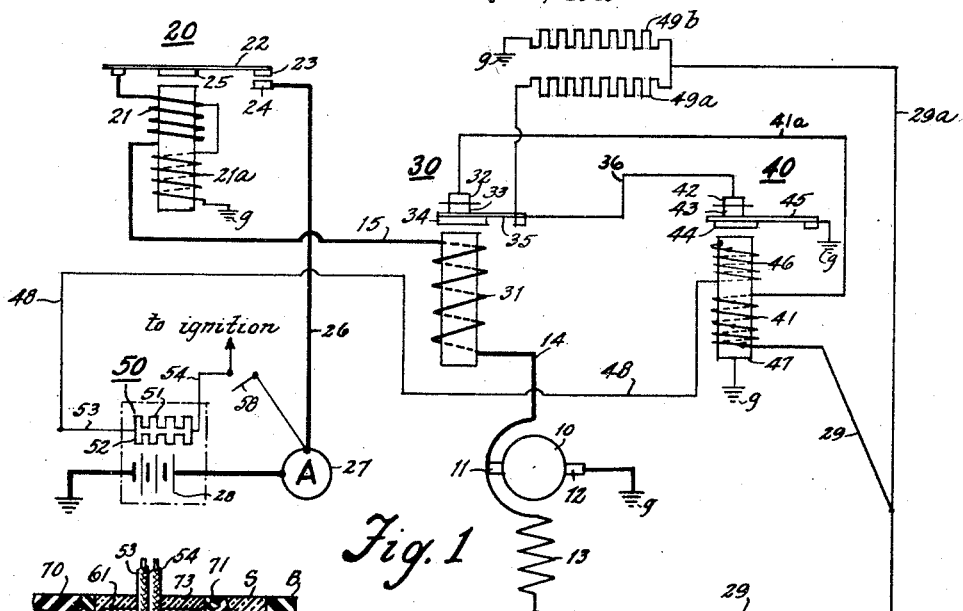
Fig. 1
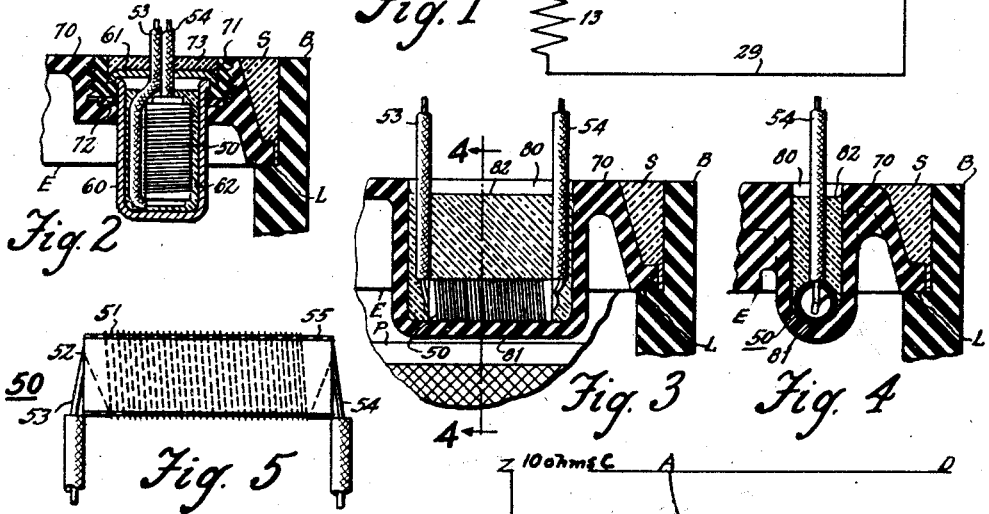
Fig. 2  Fig. 3  Fig. 4
Fig. 5
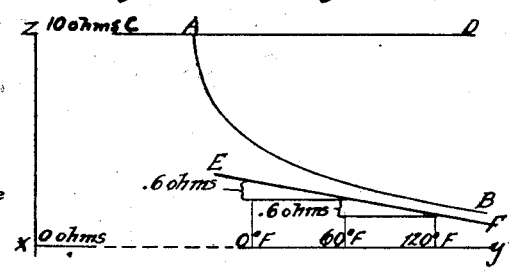
Fig. 6  Fig. 7
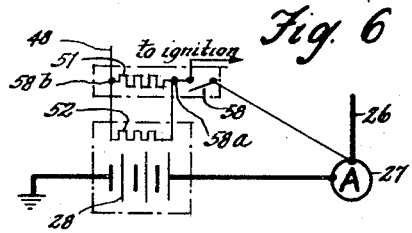
Fig. 8
INVENTOR
William J. Rady
BY
Spencer, Hardman & Fehr
his ATTORNEYS Patented June 3, 1947

2,421,523

UNITED STATES PATENT OFFICE 2,421,523

BATTERY-CHARGING SYSTEM

William J. Rady, Anderson, Ind., assignor to General Motors Corporation, Detroit, Mich., a corporation of Delaware Application July 23, 1945, Serial No. 606,668

4 Claims. (Cl. 320—35)

1

This invention relates to battery charging systems particularly for use on automotive vehicles where the storage battery is subjected to wide variations in temperature.

This application is a continuation in part of my application Serial No. 518,386, filed January 15, 1944.

It is an object of the present invention to provide improvements in the control of battery charge rate in accordance with battery temperature. This object is accomplished by changing the resistance of the circuit of the actuator coil of the voltage regulator by the use of a resistance unit located in the battery and having a negative temperature coefficient of resistance. Therefore when the temperature increases the resistance of the circuit of voltage regulator actuating coil will decrease thereby causing the voltage regulator to operate at a lower voltage. Conversely, when the battery temperature decreases, the resistance of the circuit of the voltage regulator actuating coil will increase thereby causing the voltage regulator to operate at a higher voltage. For example, if a voltage regulator is set to regulate at 7.2 volts at normal temperature, 60° F., when the temperature of the battery increases to 120° F. the battery charging voltage will be decreased to 6.9 volts thereby protecting the battery in hot weather; and when the temperature falls to 0° F., the battery charging voltage will be increased to 7.5 volts in order to provide adequate charging of the battery in cold weather.

In this connection, it is a further object of the invention to provide a resistance unit having the required amount of negative temperature coefficient required for the correct control of the battery charge rate in accordance with temperature and to provide for the convenient housing of such a resistance unit in heat receiving relation to the electrolyte of the storage battery.

Further objects and advantages of the present invention will be apparent from the following description, reference being had to the accompanying drawings wherein preferred embodiments of the present invention are clearly shown.

In the drawings:

Fig. 1 is a wiring diagram illustrating the use of the present invention.

Fig. 2 is a sectional view showing a form of installation of a negative temperature coefficient resistance unit in a storage battery.

Fig. 3 is a sectional view showing another form of installation of the resistance unit.

Fig. 4 is a sectional view on line 4—4 of Fig. 3.

Fig. 5 is a side view, partly in section, on the

2 resistance unit and is drawn to a larger scale than Figs. 2, 3 and 4.

Fig. 6 is a wiring diagram of the circuit of the voltage regulator actuator coil which includes the resistance unit.

Fig. 7 is a chart showing the mode of operation of the resistance unit.

Fig. 8 is a modification of the diagram shown in Fig. 1.

Referring to Fig. 1, a generator 10 having brushes 11 and 12 and a shunt field 13 charges a storage battery 28 through the circuit shown in heavy lines. This circuit includes brush 11, wire 14, actuator coil 31 of current regulator 30, wire 15, current responsive coil 21 of reverse current relay 20, spring blade 22 carrying relay armature 25 and contact 23, contact 24, wire 26, ammeter 27, battery 28 and ground connections g to generator brush 12. The relay 20 has a voltage responsive coil 21a.

The generator shunt-field circuit across the charging line, is shown in medium lines in Fig. 1. It includes brush 11 field coil 13 and three parallel resistance paths to ground. One path is wire 29, coil 41 of voltage regulator 40, wire 41a, normally closed contacts 32 and 33 of current regulator 30, spring blade 35 carrying armature 34 of regulator 30, wire 36, normally closed contacts 42 and 43 of voltage regulator 40, spring blade 45 carrying armature 44 and ground connection g to generator brush 12. Another path is wire 29a branching from wire 29, resistance 49a, wire 36, normally closed contacts 42 and 43 of voltage regulator 40, armature spring blade 45 and ground g. Another path is wire 29a, resistance 49b and ground g. The first mentioned path has relatively low resistance and normally carries most of the field current; and it provides a normally closed short circuit of resistance 49a and 49b.

The circuit of the actuating coil of the voltage regulator 40 is shown in fine lines in Fig. 1. This circuit includes the regulator actuating coil 46 grounded on the voltage regulator magnet core 47 grounded at g, wire 48 connected with a resistance unit 50 comprising parallel resistances 51 and 52, the ignition switch 58 and the wire 26. Thus, the coil 46 of the voltage regulator 40 is responsive to the voltage at which the battery is charged by the generator. When this voltage exceeds a certain amount, the contact 43 will be separated from contact 42 of the regulator 40 thereby interrupting a circuit which includes the magnet coil 41 and which had short circuited the resistance 49b. Field current is reduced and, consequently, generator voltage falls. Magnetism of the voltage regulator magnet quickly falls due to decrease in generator voltage and to opening the circuit of coil 41. Blade 45 causes the contact 43 to reengage the contact 42 and the interrupted short circuit of resistance 49b which includes magnet coil 41 is reestablished. The generator field current and the generator voltage quickly increase and the magnetism of the voltage regulator is quickly increased due to increase of voltage impressed on coil 46 and due to rendering the coil 41 effective. Thus the voltage regulator armature 44 and contact 43 are caused to vibrate rapidly to maintain the generator voltage within predetermined limits.

When the current in coil 31 of the current regulator 30 exceeds a certain value, contact 33 separates from contact 32 to render resistances 49a and 49b, in parallel, effective to reduce the current in field winding 13, hence generator voltage and current output. Reduction in current output results in reengagement of contacts 32 and 33, increase in field current, generator voltage and generator current output and the separation of the contacts 32, 33. The vibratory action of the blade 35 and contact 33 will continue so long as the current output tends to exceed that for which the current regulator is set to operate.

As shown in Fig. 2, the resistance unit 50 is housed within a lead case 60 having a cover 61 through which the lead wires 53 and 54 extend. The unit is embedded in acid resisting sealing compound 62. The case extends downwardly through a hole in the battery case cover 70 and is retained by a nut 71 screw threadedly engaging the cover and clamping a rubber washer 72 thereby causing it to seal the joint between the cover 70 and the nut 71 and between the cover 70 and the lead case 60. The cover 61 of the lead case 60 is located below the upper surface of the nut 71 so as to provide a recess which receives sealing compound 73. In the installation shown in Figs. 3 and 4, the cover is shaped to provide a recess 80 having a semi-cylindrical bottom 81 upon which the resistance unit 50 rests. The recess 80 is filled with sealing compound 82 in which the resistance unit is embedded.

In Figs. 2, 3 and 4 the battery box B is provided with a ledge L upon which the cover 70 is supported. The grooves between the box and the adjacent sides of the cover are filled with sealing compound S. In Fig. 3 the plate level is indicated at P and the electrolyte level at E in Figs. 2, 3 and 4. Thus, it will be seen that the resistance unit 50 is placed in close proximity to the electrolyte of the storage battery and is therefore responsive to variations in the temperature of the battery.

Referring to Fig. 5, the resistance unit 50 comprises the coil 51 wound around a non-conducting tube 55 within which is located a resistance element 52. The elements 51 and 52 are connected in parallel and their terminals are connected with the leads 53 and 54. As stated in Fig. 6, the resistance element 51 has zero temperature coefficient of resistance, and the unit 52 has negative temperature coefficient of resistance. The elements 51 and 52 are connected in parallel and both together in series with the voltage regulator actuator coil 46.

The amount of resistance of the elements 51 and 52 depends upon the results to be accomplished. The following example is given: assume a normal charge rate of 7.2 volts for a battery temperature of 60° F., and that it is desired to reduce the charging voltage to 6.9 volts at 120° F., battery temperature, and to increase the charging voltage at 7.5 volts at 0° F., battery temperature. The voltage change for each 60° F., temperature change is .3 volt. Let it be assumed, for example, that the resistance of the voltage regulator actuator coil circuit is 14 ohms at 60° F. It is necessary to change this resistance by adding to it a certain amount in order to decrease the voltage .3 volt when the temperature increases 60° F. above normal and to increase the resistance by the same amount in order to increase the voltage .3 volt when the temperature is 60° F. below normal. The circuit shown in Fig. 6 operates around 7 volts. Since it has normally 14 ohms resistance, the resistance per volt is 2 ohms. The change in resistance required to respond to 60° F., temperature change is 2×.3=.6 ohm. Since the resistance unit 50 is required to increase resistance as the temperature decreases, the resistance element 52 is one having a variable negative temperature coefficient of resistance. The resistance characteristic of element 52 is represented in Fig. 7 by the curve AB, which is related to abscissa x—y representing absolute temperature in degrees Fahr., and to ordinate x—z representing resistance in ohms. The element 51 has substantially zero temperature coefficient of resistance as represented by horizontal line C—D. The resistance values of elements 51 and 52 are such that the parallel combination of these elements has a resistance characteristic represented by line E—F, in Fig. 7. For example, the resistance of element 51 is 10 ohms and the resistance of element 52 at 60° F. is 3 ohms. The resistance of the combination at 60° F. is about 2.3 ohms. That portion of E—F between 0° F. and 120° F. is practically a straight line and has such a slope that for each 60° F. change of temperature the resistance of the unit 50 will change .6 ohm. For example, if the resistance of the combination is 2.3 at 60° it will be 1.7 at 120° and 2.9 at 0° F. Therefore, if the total resistance of the circuit shown in Fig. 6 is 14 ohms at 60° F., it will be 13.4 ohms at 120° F. and 14.6 ohms at 0° F. Therefore, according to the foregoing calculations, if the normal charging voltage at 60° F., as set by the regulator 40 is 7.2 volts, the voltage will gradually decrease while the temperature increases so that, at 120° F., the regulator will hold the charging voltage at 6.9 volts. Conversely, as the temperature falls below 60° F. the voltage regulator will gradually increase the charging voltage to 7.5 volts at 0° F.

Thus, without the use of the temperature controlled circuit making and breaking devices, it is possible to make the voltage regulator sensitive to variations in battery temperature merely by the use of a resistance unit having a suitable negative temperature coefficient of resistance. Obviously the unit 50 need not be a combination of parallel resistances if a single resistance having the proper negative temperature coefficient of resistance were available. However a resistance unit having the required negative temperature coefficient of resistance may be fabricated with the use of materials which are available, such as wire having practically zero temperature coefficient of resistance and a resistance material having negative temperature coefficient of resistance represented, for example, by curve A—B of Fig. 7.

Since resistance element 51 has negligible temperature coefficient of resistance, it need not be located in the storage battery. Instead of unit 50 having both resistance elements 51 and 52, the unit to be located in the battery could be the unit 50' (Fig. 8) having only the element 52. As a matter of convenience element 51 is shown in Figs. 2, 3 and 4 as wound upon the resistance element 52; but it could be located outside the battery as shown in Fig. 8 and mounted upon the ignition switch 58. The ignition switch could be provided with terminals 58a and 58b between which the element 51 is connected and to which the terminals 54 and 53 of element 52 of resistance unit 50' are respectively connected.

While the embodiments of the present invention as herein disclosed, constitute preferred forms, it is to be understood that other forms might be adopted, all coming within the scope of the claims which follow.

What is claimed is as follows:

1. A battery charging system comprising a generator having an armature and a shunt field, a storage battery, conducting means connecting the terminals of the armature with the terminals of the battery and providing the battery charging line, and only two generator control circuits connected across the line, one circuit comprising, in series, the shunt field and a field current controlling resistance, the other circuit comprising, in series, an electromagnet coil and a coil controlling resistance unit in heat receiving relation to the battery and having a negative temperature coefficient of resistance which is substantially constant within the range of battery operating temperatures, and means under control by said electromagnet coil for controlling the field current controlling resistance.

2. A system according to claim 1 in which the electromagnet coil controlling resistance unit comprises parallel resistance elements one of which has a variable negative temperature coefficient of resistance, the coefficient increasing as temperature decreases, the other element having substantially zero temperature coefficient of resistance, the values of the resistances of the elements being such that the unit has substantially constant negative temperature coefficient of resistance within the range of battery operating temperatures.

3. A battery charging system comprising a generator having an armature and a shunt field, a storage battery, conducting means connecting the terminals of the armature with the terminals of the battery and providing the battery charging line, and only two generator control circuits connected across the line, one circuit comprising, in series, the shunt field and a field current controlling resistance, the other circuit comprising, in series, an electromagnet coil and a coil controlling resistance comprising parallel resistance elements one of which has a variable negative temperature coefficient of resistance, the coefficient increasing as temperature decreases, the other element having substantially zero temperature coefficient of resistance, the values of the resistances of the elements being such that the coil-controlling resistance has substantially constant negative temperature coefficient of resistance within the range of battery operating temperatures, at least the resistance element having negative temperature coefficient of resistance being located in heat receiving relation to the battery.

4. A system according to claim 3 in which the resistance having substantially zero temperature coefficient of resistance is mounted on a switch which controls the circuit of the electromagnet coil and coil controlling resistance.

WILLIAM J. RADY.